(12) United States Patent
McDaniel et al.

(10) Patent No.: US 7,638,456 B2
(45) Date of Patent: Dec. 29, 2009

(54) METHODS OF PREPARING A POLYMERIZATION CATALYST

(75) Inventors: Max P. McDaniel, Bartlesville, OK (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 69 days.

(21) Appl. No.: 11/959,201

(22) Filed: Dec. 18, 2007

(65) Prior Publication Data

US 2009/0156762 A1  Jun. 18, 2009

(51) Int. Cl.
  *B01J 21/02* (2006.01)
(52) U.S. Cl. ............... 502/202; 502/102; 502/103; 502/104; 502/117; 502/204; 502/415
(58) Field of Classification Search ............ 502/102, 502/103, 104, 117, 202, 204, 415
  See application file for complete search history.

(56) References Cited

U.S. PATENT DOCUMENTS

| | | | |
|---|---|---|---|
| 3,248,179 A | | 4/1966 | Norwood |
| 3,620,981 A | | 11/1971 | Magoon et al. |
| 3,976,632 A | | 8/1976 | Delap |
| 4,118,340 A | * | 10/1978 | Rekers ............ 502/107 |
| 4,194,074 A | * | 3/1980 | Pullukat et al. ........ 526/100 |
| 4,303,770 A | * | 12/1981 | Pullukat et al. ........ 526/96 |
| 4,310,440 A | | 1/1982 | Wilson et al. |
| 4,501,885 A | | 2/1985 | Sherk et al. |
| 4,544,791 A | | 10/1985 | Juguin et al. |
| 4,588,790 A | | 5/1986 | Jenkins, III et al. |
| 5,155,186 A | | 10/1992 | Hogan et al. |
| 5,352,749 A | | 10/1994 | DeChellis et al. |
| 5,436,304 A | | 7/1995 | Griffin et al. |
| 5,455,314 A | | 10/1995 | Burns et al. |
| 5,565,175 A | | 10/1996 | Hottovy et al. |
| 5,575,979 A | | 11/1996 | Hanson |
| 6,165,929 A | | 12/2000 | McDaniel et al. |
| 6,239,235 B1 | | 5/2001 | Hottovy et al. |
| 6,262,191 B1 | | 7/2001 | Hottovy et al. |
| 6,280,610 B1 | | 8/2001 | Uragami et al. |
| 6,667,274 B1 | | 12/2003 | Hawley et al. |
| 6,833,415 B2 | | 12/2004 | Kendrick et al. |
| 6,867,278 B2 | | 3/2005 | McDaniel et al. |
| 7,012,038 B2 | | 3/2006 | Alerasool et al. |
| 7,214,642 B2 | | 5/2007 | McDaniel et al. |
| 2005/0020437 A1 | | 1/2005 | Winkler et al. |

FOREIGN PATENT DOCUMENTS

JP  06210182  8/1994

OTHER PUBLICATIONS

Bird, R. Byron, et al., "Dynamics of polymeric liquids; vol. 1: fluid mechanics," 1987, pp. xiii-xviii, 171-172, and 2 publishing pages, John Wiley & Sons, Inc., USA.
Hieber, C. A., et al., "Shear-rate-dependence modeling of polymer melt viscosity," Jul. 1992, pp. 931-938, vol. 32, No. 14, Polymer Engineering and Science.
Hieber, C. A., et al., "Some correlations involving the shear viscosity of polystyrene melts," 1989, pp. 321-332, vol. 28, No. 4, Rheologica Acta.
McDaniel, M. P., et al., "Long chain branching in polyethylene from the Phillips chromium catalyst," Phillips Research Center, Bartlesville, Oklahoma, USA, 40 pages.
Yamaguchi, Kazuo, et al., "Polymerization catalysts of olefins," CAPLUS abstract of Japanese patent 48007075B4 published on Jan. 29, 1973, 1 page, ACS on SciFinder (2007).

* cited by examiner

*Primary Examiner*—Ling-Siu Choi
(74) *Attorney, Agent, or Firm*—Conley Rose, P.C.; Rodney B. Carroll; Cheryl Huseman

(57) ABSTRACT

A method comprising contacting a support with one or more chromium-containing compounds and one or more boria precursors to provide a catalyst precursor, and activating the catalyst precursor to provide a polymerization catalyst.

25 Claims, 3 Drawing Sheets

METHODS OF PREPARING A POLYMERIZATION CATALYST

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD

The present disclosure generally relates to catalyst compositions. More specifically, the present disclosure relates to methods of preparing chromium/alumina polymerization catalyst compositions comprising boria.

BACKGROUND

Polymerization catalysts are known, however methods of producing these catalysts may suffer from a variety of drawbacks. Enhancements in preparation methods for polymerization catalysts can reduce the costs associated with catalyst production and improve process economics. Thus, there is an ongoing need to develop new methods of preparing polymerization catalysts.

SUMMARY

Disclosed herein is a method comprising contacting a support with one or more chromium-containing compounds and one or more boria precursors to provide a catalyst precursor, and activating the catalyst precursor to provide a polymerization catalyst.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
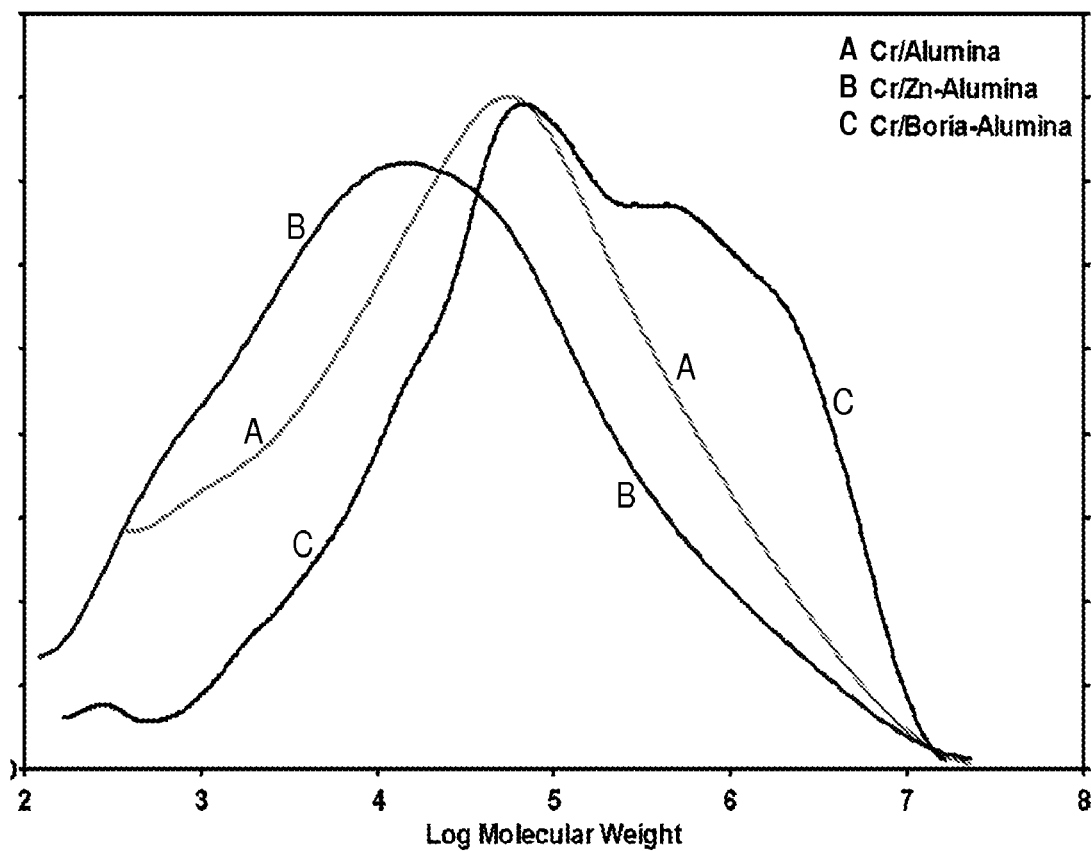
FIG. 1 is a graph of dW/d(log M) as a function of the log molecular weight for the samples from Example 1.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods of preparing catalysts comprising a support, chromium, and boria, which may function as polymerization catalysts. Hereinafter such catalysts are termed boria-containing polymerization catalysts (BCPC). The BCPCs may display an increased polymerization activity and produce polymeric compositions comprising a reduced amount of low molecular weight components when compared to an otherwise similar catalyst lacking boria.

In an embodiment, the BCPC comprises a support, alternatively an alumina support. Alumina supports suitable for use in this disclosure may have a surface area and pore volume effective to provide for an active BCPC. The surface area of the alumina support may range from about 100 square meters per gram ($m^2/g$) to about 1000 $m^2/g$, or from about 200 $m^2/g$ to about 600 $m^2/g$, or from about 250 $m^2/g$ to about 450 $m^2/g$. Furthermore, the pore volume of the alumina support may range from about 0.5 cubic centimeters per gram (cc/g) to about 4 cc/g, or from about 1 cc/g to about 3 cc/g, or from about 1.2 cc/g to about 2 cc/g. In an embodiment, the support comprises equal to or greater than about 70% alumina. Examples of suitable commercially available alumina include without limitation VGL 250 which is a commercial grade alumina available from UOP LLC and Alumina A available from W.R. Grace and Company.

In an embodiment, the alumina support may be prepared by precipitating sodium aluminate with or without a cation and aluminum to yield an aluminum oxide (also known as boehmite) with a chemical formula of (AlOOH). Alternatively, the alumina support may be prepared by the conversion of boehmite into gamma alumina with a chemical formula of ($Al_2O_3$). The conversion may be carried out by thermal treatment of boehmite in an oxidizing environment (e.g., air) at a temperature in the range of from about 300° C. to about 1000° C., or from about 350° C. to about 800° C., or from about 400° C. to about 600° C., for a time period of from about 1 hour to about 30 hours, or from about 2 hours to about 20 hours, or from about 5 hours to about 12 hours. The alumina support may include additional components that do not adversely affect the catalyst, such as zirconia, silica, thoria, magnesia, fluoride, sulfate, phosphate, or mixtures thereof.

Alternatively, the support may comprise aluminophosphate. In an embodiment, the surface area of the aluminophosphate support may range from about 100 $m^2/g$ to about 1000 $m^2/g$, or from about 200 $m^2/g$ to about 600 $m^2/g$, or from about 250 $m^2/g$ to about 450 $m^2/g$. Furthermore, the pore volume of the aluminophosphate support may range from about 0.5 cc/g to about 5 cc/g, or from about 1 cc/g to about 3 cc/g, or from about 1.2 cc/g to about 2 cc/g. The aluminophosphate support may be prepared using any suitable technique. For example, the aluminophosphate support may be prepared by hydrothermal crystallization at elevated temperatures of aluminophosphate gels containing a molecular structure-forming template as described in U.S. Pat. No. 4,310,440, which is incorporated by reference herein in its entirety. Alternatively, the aluminophosphate support may be prepared by adding base to an acidic solution containing $Al^{+3}$ and $PO_4^{-3}$ ions. Alternatively, the aluminophosphate support may also be prepared by treating an alumina or aluminate support with a phosphate source like phosphoric acid.

Hereinafter, the disclosure will focus on the use of an alumina support material although other support materials of the type disclosed herein (e.g., aluminophosphates, aluminosilicates) are also contemplated.

The support (e.g., alumina) may be present in the BCPC in amounts of from about 50 to about 99 percent (%) support by weight of the BCPC, alternatively from about 75% to about 99%, alternatively from about 90% to about 99%. Herein the percentage of support refers to the final percent of support associated with the catalyst by total weight of the catalyst after all processing steps. In an embodiment, the BCPC comprises equal to or greater than about 90% support by final weight of the catalyst and the support comprises equal to or greater than about 70% alumina.

In an embodiment, the BCPC comprises chromium. Chromium may be introduced to the BCPC via contacting one or more of the other components of the BCPC (e.g., the support such as alumina) with a chromium-containing compound. The chromium-containing compound may comprise a water-soluble chromium compound or a hydrocarbon-soluble chromium compound. Examples of water-soluble chromium compounds include chromium trioxide, chromium acetate, chromium nitrate, or combinations thereof. Examples of hydrocarbon-soluble chromium compounds include tertiary butyl chromate, a diarene chromium (0) compound, biscyclopentadienyl chromium (II), chromium (III) acetylacetonate, or combinations thereof. The chromium-containing compound may be a chromium (II) compound, chromium (III) compound, a chromium (VI) compound, or combinations thereof. Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof. Examples of other suitable chromium-containing compounds include tertiary butyl chromate in a hydrocarbon liquid; chromium trioxide in water or acetonitrile; chromium acetate in water; chromium nitrate in alcohol; zerovalent organochromium compounds such as pi bonded chromium complexes, for example, dicumene chromium and dibenzene chromium in a hydrocarbon; or combinations thereof. Pi bonded chromium complexes are described in U.S. Pat. No. 3,976,632, which is incorporated by reference herein in its entirety.

The amount of chromium present in the BCPC may range from about 0.01% to about 10% chromium by weight of the BCPC, alternatively from about 0.2% to about 5% chromium, alternatively from about 0.5% to about 2% chromium, alternatively about 1% chromium. Herein the percentage chromium refers to the final percent chromium associated with the catalyst by total weight of the catalyst after all processing steps.

In an embodiment, the BCPC comprises boria. Boria, chemical formula of $B_2O_3$ (CAS No. 1303-86-2) is also known as boron oxide, diboron trioxide, boron sesquioxide, boric oxide, anhydric boric acid and is typically found as a white or colorless solid.

Boria may be incorporated into the BCPC via contacting of the other components of the BCPC (e.g., the support such as alumina) with one or more boria precursors. Examples of boria precursors suitable for use in this disclosure include without limitation boric acid, boron oxide, sodium metaborate, potassium metaborate, metaboric acid, orthoboric acid, tetraboric acid, boron alkoxide, borates, boric ethide, or combinations thereof. Additionally, any organic boron compounds that can be converted to boria may also serve as the boria precursor. In an embodiment, the boria precursor comprises boric acid.

The amount of boria present in the BCPC may be equal to or less than about 30% boria by total weight of the BCPC after all processing steps, alternatively from about 0.5% to about 20% boria, alternatively from about 1% to about 10% boria, alternatively from about 2% to about 6%.

In an embodiment, a method of preparing a BCPC comprises sequentially contacting a support (e.g., alumina), one or more chromium-containing compounds, and one or more boria precursors. The sequential contacting may be carried out in any order desired by the user and compatible with the process. For example, the BCPC may be prepared by contacting a chromium-containing compound with an alumina support to produce a chromium/alumina mixture. The chromium/alumina mixture may subsequently be contacted with a boria precursor. Alternatively, the boria precursor may be contacted with the alumina support to form a boria/alumina mixture which may subsequently be contacted with a chromium-containing compound.

In an alternative embodiment, a support (e.g., alumina), one or more chromium-containing compounds, and one or more boria precursors may be contacted simultaneously to form a chromium/alumina/boria mixture termed a precursor BCPC, which may be further treated and activated as described herein.

In an embodiment, a method of preparing a BCPC comprises contacting an alumina support with one or more boria precursors to form an alumina/boria mixture. The boria precursors may be of the type previously described herein. The boria may be added to the alumina support by contacting via impregnation, incipient wetness, co-gelling, or the like.

The boria/alumina mixture may subsequently be contacted with one or more chromium-containing compounds. The chromium-containing compounds may be of the type previously described herein. Chromium may be added to the boria/alumina mixture via a variety of techniques. For example, the chromium may be added by contacting the chromium-containing compound with the boria/alumina mixture via ion-exchange, incipient wetness, pore fill, aqueous impregnation, organic solvent impregnation, melt coating, co-gelling, and the like. The resulting composition is a precursor BCPC.

In another embodiment, a method of preparing a BCPC comprises contacting an alumina support with one or more chromium-containing compounds to form a chromium/alumina mixture. The chromium/alumina mixture may subsequently be contacted with one or more boria precursors to form a precursor BCPC. Contacting of the components to form the chromium/alumina mixture or the precursor BCPC may be carried out using any of the techniques previously described herein.

In some embodiments, the alumina support may be precalcined prior to use in the preparation of a BCPC (e.g., prior to contact with a chromium containing compound or a boria precursor). For example, the alumina may be heated in the presence of air at a temperature in the range of from about 300° C. to about 1,000° C., or from about 400° C. to about 800° C., or from about 500° C. to about 700° C. for a time of from about 1 min to about 10 hours, or from about 20 min to about 5 hours, or from about 1 hour to about 3 hours.

The resulting precursor BCPC may be activated to produce a BCPC. In an embodiment, activation of the precursor BCPC comprises heating the material at a temperature ranging from about 400° C. to about 1,000° C., or from about 500° C. to about 800° C., or from about 600° C. to about 700° C., and for a time period of from about 1 min to about 10 hours, or from about 20 min to about 5 hours, or from about 1 to about 3 hours. The resulting material is a BCPC which may function as a polymerization catalyst when employed in a polymerization reaction/system.

The catalysts and resins of the present invention (i.e. BCPCs) are intended for any olefin polymerization method using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

In an embodiment, the olefin polymerization catalyst described herein is a component of a catalyst system wherein the catalyst system comprises a BCPC and a cocatalyst. Generally, the cocatalyst can be any organometallic compound capable of activating the catalyst described herein (i.e., BCPC) to polymerize olefins. Suitable cocatalysts can include monomeric or oligomeric metal alkyls, metal aryls, metal alkyl-aryls comprising at least one of the metals selected from the group consisting of B, Al, Be, Mg, Ca, Sr, Ba, Li, Na, K, Rb, Cs, Zn, Cd, and Sn. In an embodiment, the cocatalyst comprises a metal alkyl such as for example an alkyl of B, Al, Zn, Li, Na, Mg, or combinations thereof. Alternatively, the cocatalyst comprises a boron alkyl. The metal alkyl can have any number of carbon atoms. However, due to commercial availability and ease of use, the metal alkyl will usually comprise less than about 70 carbon atoms per metal alkyl molecule and alternatively less than about 20 carbon atoms per molecule. In an embodiment, the cocatalyst comprises a boron alkyl comprising a hydrocarbyl group having from about 1 to about 12 carbons. The cocatalyst may be introduced directly to a reaction zone with BCPC or may be contacted with the BCPC prior to form a catalyst mixture that is subsequently introduced to a reaction zone. In an embodiment, the cocatalyst may be present in an amount of from about 0.1 to about 50 ppm, alternatively of from about 1 to about 20 ppm, alternatively of from about 2 to about 10 ppm.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor comprising vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts prepared in accordance with the present disclosure may be used for the polymerization of olefins, for example, alpha-olefins. In an embodiment, a BCPC is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene or the like.

In an embodiment, polyethylene homopolymers and copolymers of ethylene with other mono-olefins are produced in the manner described above using the catalyst (i.e., BCPC) prepared as described herein. Polymer resins produced as disclosed herein may be formed into articles of manufacture or end use articles using techniques such as extrusion, blow molding, injection molding, fiber spinning, thermoforming, and casting. The BCPCs disclosed herein may also be used to form polymers such as polyolefins and PE-100 pipes having both small diameter (1 inch to 12 inches in diameter) and large diameter (greater than 12 inches in diameter). The PE100 pipe is described in U.S. Patent Application Pub. No. 2003/0199648 A1 published on Oct. 23, 2003, which is incorporated herein by reference in its entirety.

In an embodiment, the BCPC has a polymerization activity of equal to or greater than about 1000 grams of polymer per grams of catalyst per hour (g/g-h), alternatively equal to or greater than about 2000 g/g-h, alternatively equal to or greater than about 3000 g/g-h. The BCPC may show an activity increase of greater than about 25%, alternatively greater than about 50%, alternatively greater than about 100% when compared to an otherwise similar catalyst lacking boria.

A BCPC may allow for the production of polymers with a reduced high load melt index (HLMI) when compared to an otherwise similar polymerization catalyst lacking boria. The HLMI represents the rate of flow of a molten resin through an orifice of 0.0825 inch diameter when subjected to a force of 21,600 grams at 190° C. as determined in accordance with ASTM D 1238. In an embodiment, a polymeric composition (e.g., polyethylene) produced using a BCPC of the type disclosed herein has an HLMI of equal to or less than about 1 gram per 10 minutes (g/10 min), alternatively equal to or less than about 0.5 g/10 min, alternatively equal to or less than about 0.1 g/10 min.

Additionally, a BCPC may produce a polymeric composition having an increased average molecular weight when compared to an otherwise similar catalyst lacking boria. For example, a polymeric composition (e.g., polyethylene) produced using a BCPC may have an average molecular weight of equal to or greater than about 500,000 Daltons, alternatively equal to or greater than about 750,000 Daltons, alternatively equal to or greater than about 1,000,000 Daltons.

The overall increase in the average molecular weight of polymeric compositions (e.g., polyethylene) produced using a BCPC of the type described herein may be attributed to a decrease in the amount of low molecular weight components (LMWC) in the composition with a concomitant increase in the amount of high molecular weight components (HMWC).

In an embodiment, a polymeric composition (e.g., polyethylene) produced using a BCPC of the type described herein has a reduction of from about 10% to about 100%, or of from about 20% to about 90%, or of from about 40% to about 75% in the amount of LMWCs having an average molecular weight of equal to or less than about 1000 Daltons. In an embodiment, a polymeric composition (e.g., polyethylene) produced using a BCPC of the type described herein has a reduction of from about 5% to about 100%, or of from about 10% to about 50%, or of from about 15% to about 40% in the amount of LMWCs having an average molecular weight of equal to or less than about 10,000 Daltons.

Alternatively, the polymeric composition (e.g., polyethylene) produced using a BCPC of the type described herein may have an increase of greater than about 50%, or greater than about 80%, or greater than about 100% in the amount of HMWCs having an average molecular weight of equal to or less than about 1,000,000 Daltons. Alternatively, the polymeric composition (e.g., polyethylene) produced using a BCPC of the type described herein may have an increase of greater than about 30%, or greater than about 50%, or greater than about 100% in the amount of HMWCs having an average molecular weight of equal to or less than about 10,000,000 Daltons.

For polyethylene, the presence of a significant amount (e.g., 5%) of low molecular weight ethylene oligomers (e.g., $C_{10}$-$C_{32}$) in the resin creates drawbacks to the use of these resins in certain applications (e.g., blow molding). The relatively low boiling points of these LMWCs when subjected to the elevated temperatures (e.g. 400° F.) used during the processing of the polyethylene resin may cause these LMWCs to vaporize, and upon exposure to ambient air, condense into airborne droplets, generating smoke. The smoke is considered objectionable by processors and impairs the acceptability of the broad MWD polyethylene resin product for certain applications. Additional drawbacks to the use of resins comprising these LMWCs include the propensity of these LMWCs to exude into mold vent holes causing plugging of the hole and thus poor operation. Polyethylene produced in accordance with the present disclosure, e.g., using BCPCs as disclosed herein, significantly improve and/or eliminate drawbacks associated with LMWCs such as smoke produced during blow molding, thereby providing for smokeless blow molding and associated advantages.

A polymeric composition (e.g., polyethylene) produced using a BCPC of the type described herein may display an increased rheological breadth when compared to a polymeric composition prepared with an otherwise similar catalyst lacking boria. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$E = E_o[1 + (T_\xi \dot{\gamma})^a]^{\frac{n-1}{a}}$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region]

To facilitate model fitting, the power law constant is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, Polym. Eng. Sci., 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987), each of which is incorporated by reference herein in its entirety. In an embodiment, the BCPC has a rheological breath (the "a" parameter in the CY model, also referred to as a CY-a) of equal to or greater than about 0.2, alternatively equal to or greater than about 0.4, alternatively equal to or greater than about 0.6.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments. Unless otherwise stated, a small amount (0.01 to 0.10 grams normally) of the solid catalyst was first charged under nitrogen to the dry reactor. Next 1.2 liter of isobutane liquid was charged and the reactor heated up to the specified temperature. Hydrogen may be added if desired. Finally ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain the set pressure. After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

A "Quantachrome Autosorb-6 Nitrogen Pore Size Distribution Instrument" was used to determine the surface area and pore volume of the supports. This instrument was acquired from the Quantachrome Corporation of Syosset, N.Y.

Molecular weight and molecular weight distributions were obtained using a PL-GPC 220 (Polymer Labs, UK) system equipped with a differential refractive index detector and three 7.5 mm×300 mm 20 um Mixed A-LS columns (Polymer Labs) running at 145° C. The flow rate of the mobile phase, 1,2,4-trichlorobenzene (TCB) containing 0.5 g/L 2,6-di-t-butyl-4-methylphenol (BHT), was set at 1 mL/min and the concentration of polymer solutions was generally kept in the range of 1.0-1.5 mg/mL, depending on the molecular weights. Sample preparation was conducted at 150° C. for 4 h with occasional and gentle agitation before the solutions being transferred to sample vials for injection. In order to minimize unbalanced solvent peak, solvent with the same composition as the mobile phase was used for solution preparation. The integral calibration method was employed to deduce molecular weights and molecular weight distributions using a Chevron Phillips Chemicals Company's broad linear polyethylene, Marlex BHB5003, as the broad standard. The integral table of the broad standard was pre-determined in a separate experiment with SEC-MALS.

Example 1

Cr/alumina catalysts were prepared by contacting Grace alumina grade A with 1% Cr. In some experiments, the Grace alumina grade A was precalcined at 600° C. prior to contact with the 1% Cr, which converts the boehmite structure (AlOOH) into gamma alumina ($Al_2O_3$). The Cr/alumina with and without precalcination were impregnated with various metals as indicated in Table 1 in amounts ranging from 1.0 to 3.0 mmol/g as an aqueous solution to incipient wetness. Then the Cr/alumina catalysts were dried and activated by calcination in dry air. Boric acid was used to impregnate boria onto the catalyst. Zinc nitrate was used to provide zinc. Likewise titanium isopropoxide, manganese nitrate, magnesium nitrate, potassium nitrate and chromium acetate were used. All the samples were then activated at either 400° C. or 600° C. and the polymerization activity tested in a bench reactor at 95° C. using 150 psi $H_2$, and 550 psi ethylene. A cocatalyst of triethyl borane was added to the reactor to equal 8 ppm of the isobutane diluent. Polymerization was allowed to continue for 30-60 minutes. Table 1 summarizes the surface area, pore volume, activity, HLMI, CY-a, and molecular weight of the polymers produced for each catalyst tested.

TABLE 1

| Sample | Metal Added | Amount Added mmol/g | Alumina Precalcined | Final Activation | Surface Area m²/g | Pore Volume Cc/g | Activity g/g-h | HLMI | CY-a | Molecular Weight Mw/1000 Daltons |
|---|---|---|---|---|---|---|---|---|---|---|
| 1 | None | | Yes | 600° C. | 328 | 1.36 | 1309 | 8.6 | 0.2148 | 364 |
| 2 | Cr | 3.0 | No | 600° C. | 283 | 0.94 | 138 | 2.7 | 0.2665 | 514 |
| 3 | Zn | 3.0 | No | 600° C. | 150 | 1.13 | 277 | 104 | 0.1995 | 277 |
| 4 | Zn | 1.0 | No | 600° C. | 297 | 1.14 | 645 | 6.0 | 0.2271 | 442 |
| 5 | Zn | 1.0 | No | 600° C. | — | — | 960 | 10.3 | 0.2050 | 368 |
| 6 | Zn | 1.0 | No | 600° C. | — | — | 141 | 67 | 0.1722 | 227 |
| 7 | Fe | 3.0 | Yes | 600° C. | 271 | 1.18 | 145 | 26.3 | 0.1959 | 353 |
| 8 | Fe | 1.0 | Yes | 600° C. | 267 | 1.14 | 591 | 8.6 | 0.1982 | 399 |
| 9 | Mg | 3.0 | Yes | 600° C. | 158 | 0.94 | 338 | 23.6 | 0.1946 | 302 |
| 10 | Mg | 3.0 | Yes | 600° C. | 158 | 0.94 | >224 | 21.0 | — | 279 |
| 11 | Mg | 3.0 | Yes | 600° C. | 155 | 0.96 | 416 | 15.1 | 0.1968 | 333 |
| 12 | Ti | 1.0 | Yes | 400° C. | 321 | 1.38 | 1035 | 8.2 | 0.2157 | 320 |
| 13 | Ti | 1.0 | Yes | 400° C. | 321 | 1.38 | 1078 | 10.0 | 0.2049 | 297 |
| 14 | Ti | 1.0 | Yes | 600° C. | 290 | 1.27 | 1379 | 6.2 | 0.2382 | 397 |
| 15 | Ti | 1.0 | Yes | 600° C. | 289 | 1.30 | 1292 | 5.7 | 0.2270 | 399 |
| 16 | Mn | 3.0 | Yes | 600° C. | | | 788 | 3.6 | 0.2125 | 376 |
| 17 | K | 3.0 | Yes | 600° C. | 309 | 1.36 | 281 | 29.5 | 0.1662 | 262 |
| 18 | B | 1.0 | No | 600° C. | 348 | 1.26 | 1681 | 0.65 | 0.3225 | 655 |
| 19 | B | 1.0 | No | 600° C. | 348 | 1.26 | 1758 | 0.15 | 0.3331 | 644 |
| 20 | B | 1.0 | No | 600° C. | 348 | 1.26 | 1745 | 0.53 | 0.3466 | 664 |
| 21 | B | 3.0 | No | 600° C. | 327 | 1.13 | 1245 | 0.45 | 0.2879 | 625 |
| 22 | B | 1.0 | Yes | 600° C. | 301 | 1.37 | 2191 | 0.00 | 0.5332 | 838 |
| 23 | B | 1.0 | Yes | 600° C. | 299 | 1.34 | 2526 | 0.00 | 0.4739 | 808 |
| 24 | B | 1.0 | Yes | 600° C. | 299 | 1.34 | 3870 | 0.00 | — | — |
| 25 | B | 1.0 | Yes | 600° C. | — | — | 2629 | 0.00 | — | — |
| 26 | B | 3.0 | Yes | 600° C. | 288 | 1.23 | 1751 | 0.03 | 0.4634 | 855 |
| 27 | B | 3.0 | Yes | 600° C. | 287 | 1.26 | 1677 | 0.06 | 0.4209 | 781 |

As shown in Table 1, the addition of boria (Samples 18 to 27) increased the polymerization activity of the Cr/alumina catalyst in some cases by up to three fold when compared to the activity of the Cr/alumina catalyst alone (Sample 1). In contrast, the addition of other metals (Samples 2 to 17) to the Cr/alumina catalyst tended to decrease the polymerization activity when compared to the polymerization activity of the Cr/alumina catalyst alone (Sample 1).

Table 1 also shows that the addition of boria to the Cr/alumina catalyst results in a decrease in the rheological breadth of the polymeric composition as evidenced by an increase in the CY-a parameter. The increase in the CY-a parameter for the Cr/alumina-boria catalyst suggests a decrease in elasticity, perhaps in part from decreased long chain branching, despite the higher molecular weight. The higher CY-a value also suggests a narrower distribution of relaxation times for the polymeric composition which may result in a lower elasticity attributed in part to a lower level of long chain branching.

Table 1 also shows that the molecular weight of the polymer produced by the Cr/alumina-boria catalyst is increased in contrast to the other catalyst compositions investigated. The polymeric composition was observed to have a reduced amount of LMWCs that can generate smoke during processing of the resin as described previously. This reduction in LMWCs can be observed in a gel permeation chromatography (GPC) curve where the dW/d(Log M) was plotted against the log molecular weight distribution for polymer samples produced using Cr/alumina, Cr/Zn-alumina, or Cr/boria-alumina catalyst, as shown FIG. 1. Referring to FIG. 1, the lower molecular weight side of the distribution has been reformed by the presence of boria in the Cr/boria-alumina curve.

As can also be seen in FIG. 1, the Cr/alumina-boria curve intercepted the Cr/alumina curve at a molecular weight of about 70,000 Daltons. The interception point suggests that the Cr/alumina-boria may decrease polymers with molecular weight of less than about 70,000 Daltons and may increase polymers with molecular weight of greater than about 70,000 Daltons. Furthermore, analysis of the plot in FIG. 1 demonstrated the average molecular weight of polymers produced with the Cr/alumina-boria catalysts was higher when compared to the average molecular weight of polymers produced with Cr/alumina or Cr/Zn-alumina catalysts. The percentage change in the amounts of polymers at the indicated molecular weight (i.e., at 1,000 Daltons; 10,000 Daltons; 100,000 Daltons; etc) were calculated and the results are tabulated in Table 2.

TABLE 2

| Sample | Molecular Weight | Increase/Decrease | Percentage Difference |
| --- | --- | --- | --- |
| 28 | 1,000 | Decrease | ~74% |
| 29 | 10,000 | Decrease | ~33% |
| 31 | 1,000,000 | Increase | ~85% |
| 32 | 10,000,000 | Increase | ~45% |

Figure 2:
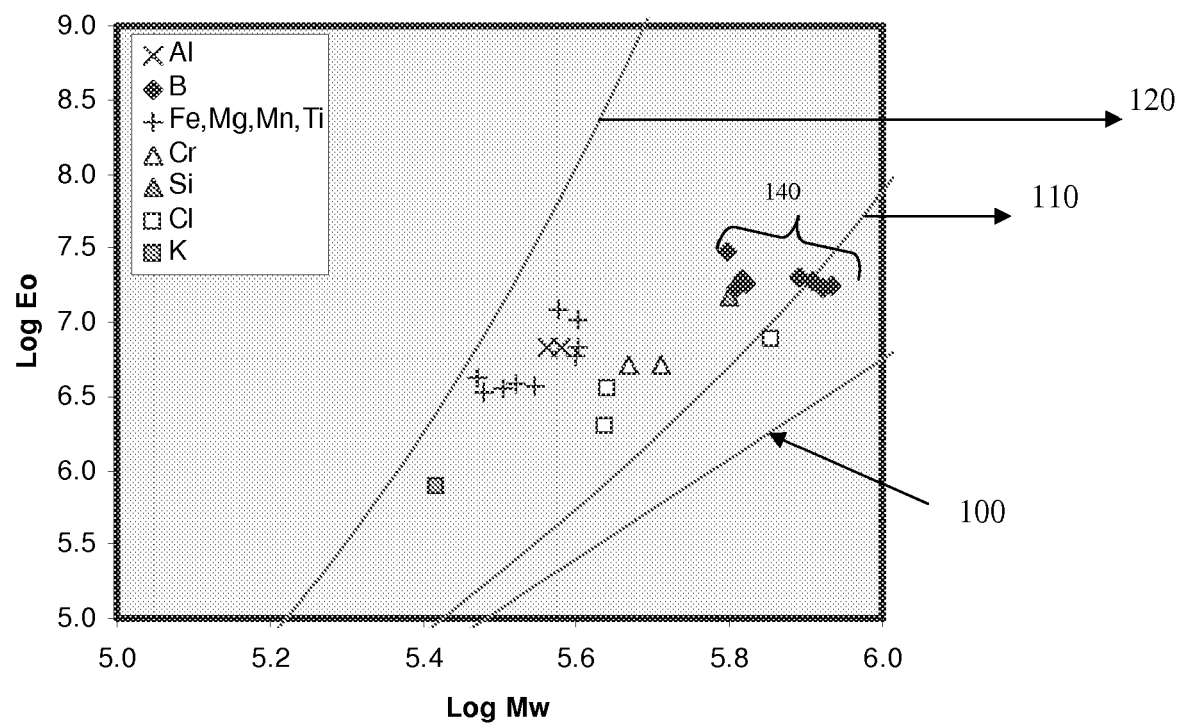
FIG. 2 is an Arnett plot of the log of the zero shear melt viscosity as a function of the log molecular weight for samples from Example 1.

Another indication of the effect of boria in decreasing elasticity from long chain branching can be seen in FIG. 2, which is an Arnett plot. Descriptions of the use of Arnett plots in analyzing long chain branching in polymeric compositions can be found in Long Chain Branching in Polyethylene from the Phillips Chromium Catalyst, M. P. McDaniel, D. C. Rohlfing, and E. A. Benham, *Polymer Reaction Engineering* Vol. 11, No. 2, pp. 105-135, 2003, which is incorporated by reference herein in its entirety. FIG. 2 is an Arnett plot of the log of the zero shear melt viscosity as a function of the log molecular weight linear and shows that linear polymers fall on the Arnett reference line 100. Thus, the further off this line a point falls, the greater the extent of long chain branching in the polymeric composition. The two curved lines represent 1 branch in $10^6$ and $10^5$ carbons, lines 110 and 120 respectively. Thus, one can see that the Cr/alumina-boria catalysts produced polymeric compositions, indicated by reference arrow 140, whose extent of long chain branching more closely resembled the extent of long chain branching depicted by reference line 100.

Example 2

The polymerization activity of a Cr/alumina catalyst prepared by precalcining the alumina support prior to impregnation with boria was investigated and compared to the activity of catalysts prepared without the precalcining step. Cr/alumina catalysts (with and without precalcining step) were impregnated with boria and were prepared as described in Example 1. Polymerization conditions were similar to those described in Example 1 with the exception that the $H_2$ concentrations were varied as indicated in Table 3. The polymerization activity with varying boria amount and the HLMI values for the polymers produced were determined and are given in Table 3. As shown in Table 3, the polymerization activities of Cr/alumina-boria catalyst prepared with precalcined alumina increased when compared to catalyst samples prepared without a precalcination step. Additionally, the results demonstrate that the HLMI decreased suggesting a reduction in the LMWCs of the polymeric composition that contribute to the formation of smoke.

TABLE 3

| Sample | Precalcined | Boria Added mmol/g | $H_2$ | Total Act | HLMI |
| --- | --- | --- | --- | --- | --- |
| 33 | NA | 0 | 150 | 1309 | 8.63 |
| 34 | No | 1 | 150 | 1681 | 0.65 |
| 35 | No | 1 | 150 | 1758 | 0.15 |
| 36 | No | 1 | 150 | 1745 | 0.53 |
| 37 | No | 3 | 150 | 1245 | 0.45 |
| 38 | Yes | 1 | 150 | 2191 | 0.00 |
| 39 | Yes | 1 | 150 | 2526 | 0.00 |
| 40 | Yes | 3 | 150 | 1751 | 0.03 |
| 41 | Yes | 3 | 150 | 1677 | 0.06 |
| 42 | NA | 0 | 0 | 1500 | 0.00 |
| 43 | Yes | 1 | 0 | 3870 | 0.00 |

Figure 3:
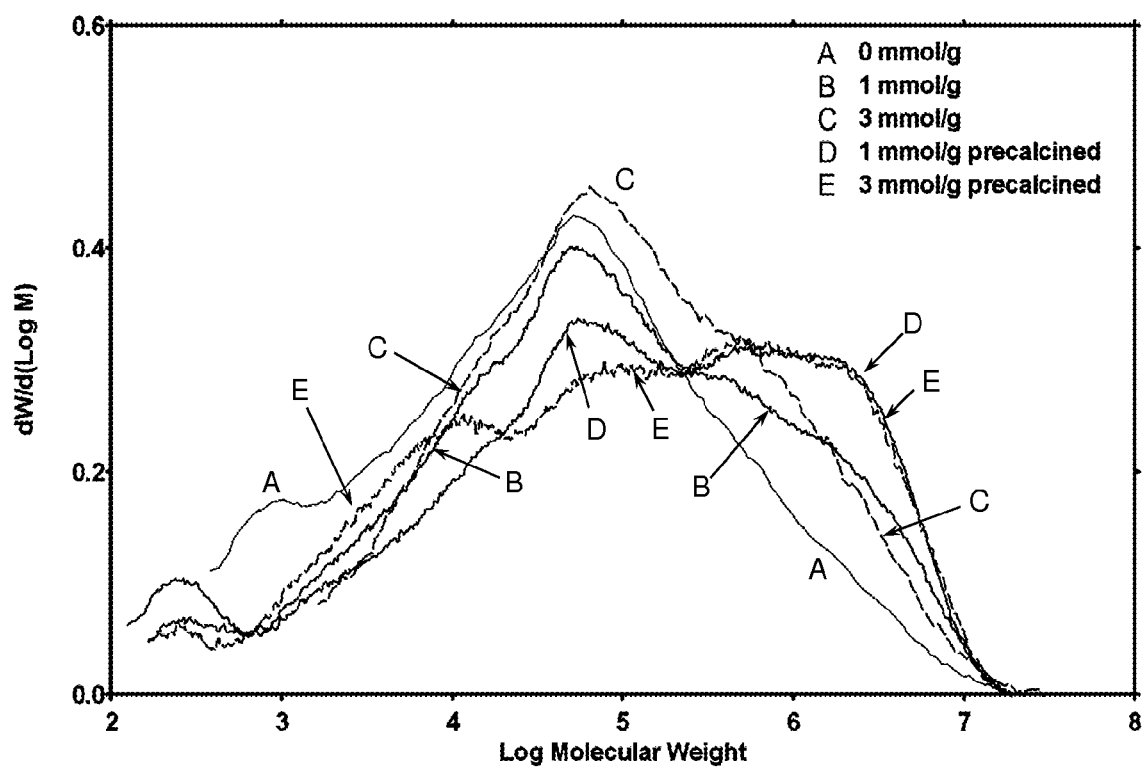
FIG. 3 is a graph of log molecular weight against dW/d(log M) for the samples from Example 2.

The molecular weight distribution of the polymeric composition was again observed to vary between polymer samples prepared using the catalysts described. FIG. 3 is a plot of the dW/d(Log M) against the log molecular weight of the polymer samples. The boria amounts and the presence or absence of a precalcination step are as indicated. The results demonstrate again that the Cr/alumina-boria catalyst generated polymeric compositions with an increased amount of HMWCs.

The effect of the boria concentration in the Cr/alumina-boria catalyst on the MWD of the polymers was also investigated. Referring to FIG. 3, the 0 mmol/g curve intercepted the 1 mmol/g curve at a molecular weight of about 200,000 Daltons. The interception point suggests that a Cr/alumina catalyst comprising 1 mmol/g boria may generate polymers with a reduced number of components having molecular weights of less than about 200,000 Daltons and may increase the number of components with molecular weights of greater than about 200,000 Daltons. Similarly, the 0 mmol/g curve intercepted the 3 mmol/g curve at a molecular weight of about 35,000. The interception point suggests that a Cr/alumina-boria catalyst comprising 3 mmol/g boria may generate a polymeric composition having a reduced number of components having molecular weights of less than about 35,000 Daltons and may increase the number of components having a molecular weight of greater than about 35,000 Daltons.

This loss of LMWCs and increase in HMWCs was enhanced by precalcination of the alumina support. Referring again to FIG. 3, the 1 mmol/g curve intercepted the 1 mmol/g precalcined curve at a molecular weight of about 250,000 Daltons. The interception point suggests that a Cr/alumina-boria catalyst containing 1 mmol/g boria that was precalcined may generate a polymeric composition having a reduced number of components with molecular weights of less than about 250,000 Daltons when compared to an otherwise similar catalyst that was not precalcined.

Similarly, the 3 mmol/g curve intercepted the 3 mmol/g precalcined curve at a molecular weight of about 250,000 Daltons. The interception point suggests that 3 mmol/g precalcined may decrease polymers with molecular weight of less than about 575,000 Daltons and may increase polymers with molecular weight of greater than about 575,000 Daltons compared to 3 mmol/g.

The molecular weight of polymers produced with a precalcined Cr/alumina-boria catalyst may be compared to those produced with a Cr/alumina-boria catalyst that was not precalcined to estimate the percentage increase or decrease for specific molecular weights (i.e., at 1,000 Daltons; 10,000 Daltons; 1,000,000 Daltons; etc), and the results are tabulated in Table 4.

TABLE 4

| Sample | Molecular Weights Daltons | Observation 0 vs. 1 | Observation 0 vs. 3 | Observation 1 vs. 1 precalcined | Observation 3 vs. 3 precalcined |
|---|---|---|---|---|---|
| 44 | 1,000 | ~58% lower | n/a | n/a | n/a |
| 45 | 10,000 | ~12% lower | ~10% lower | ~20% lower | ~5% lower |
| 47 | 1,000,000 | ~47% higher | ~65% higher | ~25% higher | ~13% higher |
| 48 | 10,000,000 | ~150% higher | ~100% higher | n/a | n/a |

While embodiments of the invention have been shown and described, modifications thereof can be made without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
   (a) contacting a support with one or more chromium-containing compounds and one or more boria precursors to provide a catalyst precursor, wherein the support is precalcined prior to contacting the support with one or more chromium-containing compounds and one or more boria precursors; and
   (b) activating the catalyst precursor to provide a polymerization catalyst.

2. The method of claim 1 wherein the support is first contacted with the boria precursor and subsequently contacted with the chromium-containing compound.

3. The method of claim 1 wherein the support is first contacted with the chromium-containing compound and subsequently contacted with the boria precursor.

4. The method of claim 1 wherein the support is contacted simultaneously with the boria precursor and the chromium-containing compound.

5. The method of claim 1 wherein the support comprises alumina, boebmite, gamma alumina, or combinations thereof 6. The method of claim 1 wherein the polymerization catalyst comprises from about 50% to about 99% support by final weight of the polymerization catalyst, and the support comprises equal to or greater than about 70% alumina.

7. The method of claim 1 wherein the chromium-containing compound comprises a water-soluble compound, a hydrocarbon-soluble compound, chromium trioxide, chromium acetate, chromium nitrate, tertiary butyl chromate, a diarene chromium (0) compound, biscyclopentadienyl chromium(II), chromium (III) acetylacetonate, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, chromium (III) compound, chromium carboxylates, chromium naphthenates, chromium halides, chromium pyrrolides, chromium benzoates, chromium dionates, chromium nitrates, chromium sulfates, chromium (III) isooctanoate, chromium (III) 2,2,6,6-tetramethylheptanedionate, chromium (III) naphthenate, chromium (III) chloride, chromium (III) tris(2-ethylhexanoate), chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, tertiary butyl chromate in a hydrocarbon liquid, chromium trioxide in water, chromium trioxide in acetonitrile, chromium acetate in water, chromium nitrate in alcohol, zerovalent organochromium compounds, pi bonded chromium complexes, dicumene chromium, dibenzene chromium in hydrocarbon, or combinations thereof.

8. The method of claim 1 wherein the polymerization catalyst comprises from about 0.01% to about 10% chromium by final weight of the polymerization catalyst.

9. The method of claim 1 wherein the boria precursor comprises boric acid, boron oxide, sodium metaborate, potassium metaborate, metaboric acid, orthoboric acid, tetraboric acid, boron alkoxide, borate, boric ethide, or combinations thereof.

10. The method of claim 1 wherein the boria precursor is boric acid and the support is alumina.

11. The method of claim 1 wherein the polymerization catalyst comprises equal to or less than about 1% boria by final weight of the polymerization catalyst.

12. The method of claim 1 wherein the contacting occurs via ion-exchange, incipient wetness, pore fill, aqueous impregnation, organic solvent impregnation, melt coating, dry mixing, or combinations thereof 13. The method of claim 1 wherein the precalcining comprises heating the support in a range of from about 400° C. to about 600° C.

14. The method of claim 2 further comprising calcining the support after contact with the boria precursor and before contact with the chromium-containing compound.

15. The method of claim 3 further comprising calcining the support after contact with the chromium-containing compound and before contact with the boria precursor.

16. The method of claim 1 wherein the catalyst precursor is activated by heating at a temperature of from about 450° C. to about 700° C. for a period of from about 1 minute to about 10 hrs.

17. The method of claim 1 wherein the polymerization catalyst has a polymerization activity of equal to or greater than about 1000 g/g-h.

18. The method of claim 1 further comprising contacting the polymerization catalyst with one or more olefin monomers in a reaction zone under suitable reaction conditions to form a polymer and recovering the polymer from the reaction zone.

19. The method of claim 18 wherein the olefin monomers comprise ethylene and the polymer comprises an ethylene homopolymer; or the olefin monomers comprise ethylene and another alpha olefin monomer and the polymer comprises an ethylene copolymer.

20. The method of claim 18 wherein the polymer has an HLMI of equal to or less than about 1 g/10 minutes.

21. The method of claim 18 wherein the polymer has Carreau-Yasada-a value of equal to or greater than about 0.2.

22. The method of claim 18 wherein the polymer has a molecular weight of equal to or greater than about 500,000 Daltons.

23. The method of claim 18 wherein the polymer has a reduction of from about 10% to about 100% in the amount of low molecular weight components having an average molecular weight of equal to or less than about 1000 Daltons.

24. The method of claim 18 wherein the polymer has an increase of greater than about 50% in the amount of high molecular weight components having an average molecular weight of equal to or greater than about 1,000,000 Daltons.

25. The method of claim 1 wherein the support comprises alumina and the alumina is precalcined in air at a temperature in the range of from about 300° C. to about 1000° C. for a time of from about 1 minute to about 10 hours.

* * * * *